United States Patent
Patel et al.

(10) Patent No.: US 11,891,108 B2
(45) Date of Patent: Feb. 6, 2024

(54) AUXILIARY UNSTOWING MECHANISM FOR VEHICLE STEERING COLUMN

(71) Applicant: Steering Solutions IP Holding Corporation, Saginaw, MI (US)

(72) Inventors: Keyur R. Patel, Auburn Hills, MI (US); Blake J. Riley, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/987,219

(22) Filed: Nov. 15, 2022

(65) Prior Publication Data

US 2023/0150565 A1    May 18, 2023

Related U.S. Application Data

(60) Provisional application No. 63/280,210, filed on Nov. 17, 2021.

(51) Int. Cl.
| | | |
|---|---|---|
| *B62D 1/183* | (2006.01) | |
| *B62D 1/184* | (2006.01) | |
| *B62D 1/181* | (2006.01) | |

(52) U.S. Cl.
CPC .............. *B62D 1/183* (2013.01); *B62D 1/181* (2013.01); *B62D 1/184* (2013.01)

(58) Field of Classification Search
CPC ......... B62D 1/183; B62D 1/181; B62D 1/184
See application file for complete search history.

(56) References Cited

U.S. PATENT DOCUMENTS

| | | | |
|---|---|---|---|
| 10,974,765 B2 | 4/2021 | Cana et al. | |
| 2020/0039563 A1 | 2/2020 | Cana et al. | |
| 2020/0070868 A1* | 3/2020 | Patel ...................... | B62D 1/181 |
| 2021/0124349 A1* | 4/2021 | Koehler ................ | B62D 1/185 |
| 2021/0171088 A1 | 6/2021 | Hwang et al. | |
| 2021/0316782 A1* | 10/2021 | Lee ....................... | B62D 5/0493 |

FOREIGN PATENT DOCUMENTS

| | | | | |
|---|---|---|---|---|
| CN | 109572798 A | * | 4/2019 | |
| CN | 114620115 A | * | 6/2022 | ............. B62D 1/181 |
| DE | 69108005 T2 | | 10/1995 | |
| DE | 102018116617 A1 | * | 1/2020 | |
| DE | 102019201619 A1 | * | 8/2020 | |
| DE | 102022130473 A1 | * | 5/2023 | ............. B62D 1/181 |
| JP | 2018117476 A | * | 7/2018 | ............. B62D 1/181 |

OTHER PUBLICATIONS

English translation of Office Action regarding corresponding DE App. No. 10 2022 130 473.6; dated Jan. 23, 2023.

* cited by examiner

*Primary Examiner* — Drew J Brown
(74) *Attorney, Agent, or Firm* — Dickinson Wright PLLC

(57) ABSTRACT

An auxiliary unstow mechanism for a vehicle steering column includes a telescope actuator assembly. The auxiliary unstow mechanism also includes a first electronic control unit (ECU) in communication with the telescope actuator assembly to control the telescope actuator assembly. The auxiliary unstow mechanism further includes a latch actuator operatively controlling a latch assembly that controls a locked condition and an unlocked condition of vehicle steering column axial position. The auxiliary unstow mechanism yet further includes a second ECU in communication with the first ECU and the latch actuator, the second ECU controlling the latch actuator.

14 Claims, 6 Drawing Sheets

AUXILIARY UNSTOWING MECHANISM FOR VEHICLE STEERING COLUMN

CROSS-REFERENCE TO RELATED APPLICATION

This application claims the benefits of priority to U.S. Patent Application Ser. No. 63/280,210, filed Nov. 17, 2021, the disclosure of which is incorporated by reference herein in its entirety.

FIELD OF THE INVENTION

The embodiments disclosed herein relate to vehicle steering column assemblies and, more particularly, to an auxiliary unstowing mechanism for such assemblies.

BACKGROUND

Stowable steering column systems for road vehicles are designed to provide increased convenience to the vehicle user by providing more space around the user in certain situations. The column is able to retract the steering wheel toward or into the vehicle dashboard when appropriate. For example, this may be desirable while the vehicle is parked. If the vehicle has the ability to steer itself in one or more driving modes and can also be steered by the user in one or more driving modes, then a stow feature may also be used while the vehicle is driven autonomously or semi-autonomously.

Inability to unstow the steering column may arise due to a failure in the system. If the column is unable to unstow, then the user may no longer be able to properly steer the vehicle. It may not be feasible for the user to steer the vehicle because of the extreme position of the steering wheel or the proximity of the steering wheel to the dashboard. Alternatively, the vehicle may not allow the user to rotate the steering wheel while it is in a particular zone within the complete range of motion of the column. If the vehicle is unable to steer itself to the user's desired destination, the user may need to have the vehicle towed and serviced immediately. The inability of the user to steer the vehicle may be inconvenient to the user.

In one example of a power column topology, a first electronic control unit (ECU) controls the telescope motor. In the case of fully stowed condition and during failure of the first ECU or telescoping control failure, the driver is unable to pilot the vehicle.

SUMMARY OF THE DISCLOSURE

According to one aspect of the disclosure, an auxiliary unstow mechanism for a vehicle steering column includes a telescope actuator assembly. The auxiliary unstow mechanism also includes a first electronic control unit (ECU) in communication with the telescope actuator assembly to control the telescope actuator assembly. The auxiliary unstow mechanism further includes a latch actuator operatively controlling a latch assembly that controls a locked condition and an unlocked condition of vehicle steering column axial position. The auxiliary unstow mechanism yet further includes a second ECU in communication with the first ECU and the latch actuator, the second ECU controlling the latch actuator.

According to another aspect of the disclosure, a method of unstowing a vehicle steering column is provided. The method includes operating a telescope actuator assembly with a first electronic control unit (ECU). The method also includes operating a latch actuator with a second ECU. The method further includes monitoring the first ECU for a failure condition of the first ECU and/or the telescope mechanism with the second ECU.

These and other advantages and features will become more apparent from the following description taken in conjunction with the drawings.

BRIEF DESCRIPTION OF DRAWINGS

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION

Figure 1:
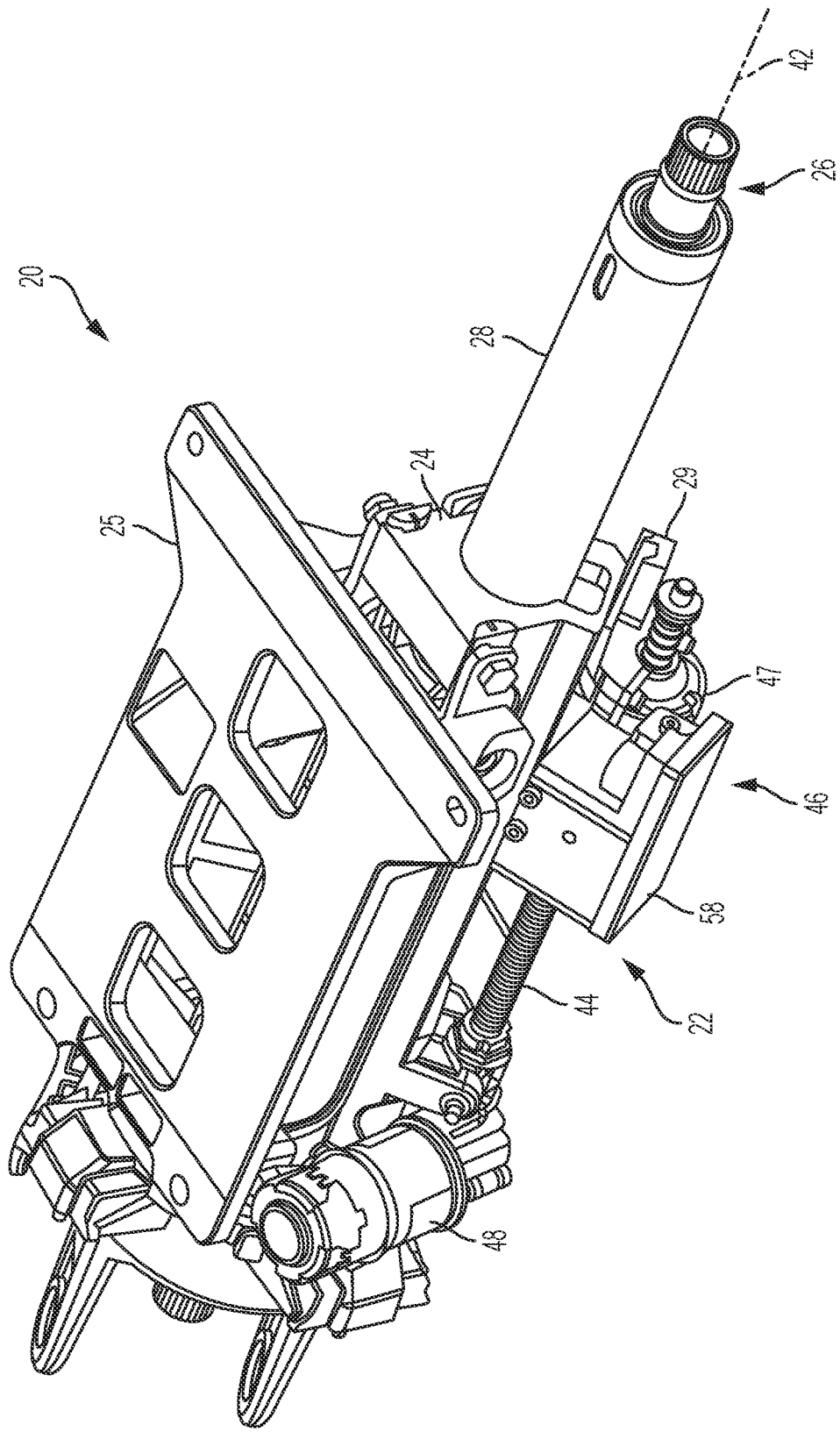
FIG. 1 is a schematic illustration of a steering column assembly having an auxiliary unstowing mechanism.

Referring now to the Figures, where the invention will be described with reference to specific embodiments, without limiting same, FIG. 1 illustrates a steering column assembly 20. The steering column assembly 20 facilitates translation of a steering wheel (not shown) and a steering shaft 26 in a retractable manner. This is particularly beneficial in embodiments where the assembly 20 is employed in a passenger vehicle equipped with Advanced Driver Assist System(s) (ADAS) to allow the vehicle to be autonomously, or semi-autonomously, controlled using sensing, steering, and/or braking technology. When the ADAS is activated, the steering wheel is not required for vehicle control in some situations. Retraction of the steering wheel and steering shaft 26 toward, and possibly into, the instrument cluster greatly enhances user comfort by providing a driver with more space. The additional space provided facilitates additional workspace area or leg room, for example.

The embodiments described herein provide a retractable steering column which allows the steering wheel to be retracted while the vehicle is in an autonomous, or semi-autonomous, driving mode, and methods associated with monitoring and adjusting the steering column assembly 20. Retraction of the steering column assembly 20 (and steering wheel) toward, and possibly into, the instrument panel may be referred to as a "stowed" position or condition, while extension of the steering column assembly 20 to a range of positions that allow an operator to manually steer the vehicle may be referred to as an "unstowed" position or condition. While the steering column assembly 20 may be in the stowed position in the autonomous or semi-autonomous driving modes, other conditions for a stowed steering column assembly 20 are also contemplated. For example, a parked vehicle may allow the steering column assembly 20 to be positioned in the stowed position.

An electric motor 48 of a telescope actuator assembly 22 at least partially retracts the steering column assembly 20 into the instrument panel of the vehicle and extends the steering column assembly 20 therefrom. However, the embodiments described herein allow manual adjustment under certain circumstances, as described herein.

Extension and retraction of the steering column assembly 20 refers to translation of a retractable portion 28 of the steering column assembly 20. The retractable portion 28 includes one or more components that are translatable. For example, in addition to the aforementioned steering wheel and the steering shaft 26, a moveable portion, which may also be referred to as an upper jacket 28 in some embodiments, is translatable relative to a stationary portion 24, which may be referred to as a lower jacket in some embodiments. Also shown is a mounting bracket 25 that couples the steering column assembly 20 to the vehicle. In other embodiments, more or fewer than two jackets are provided.

Figure 2:
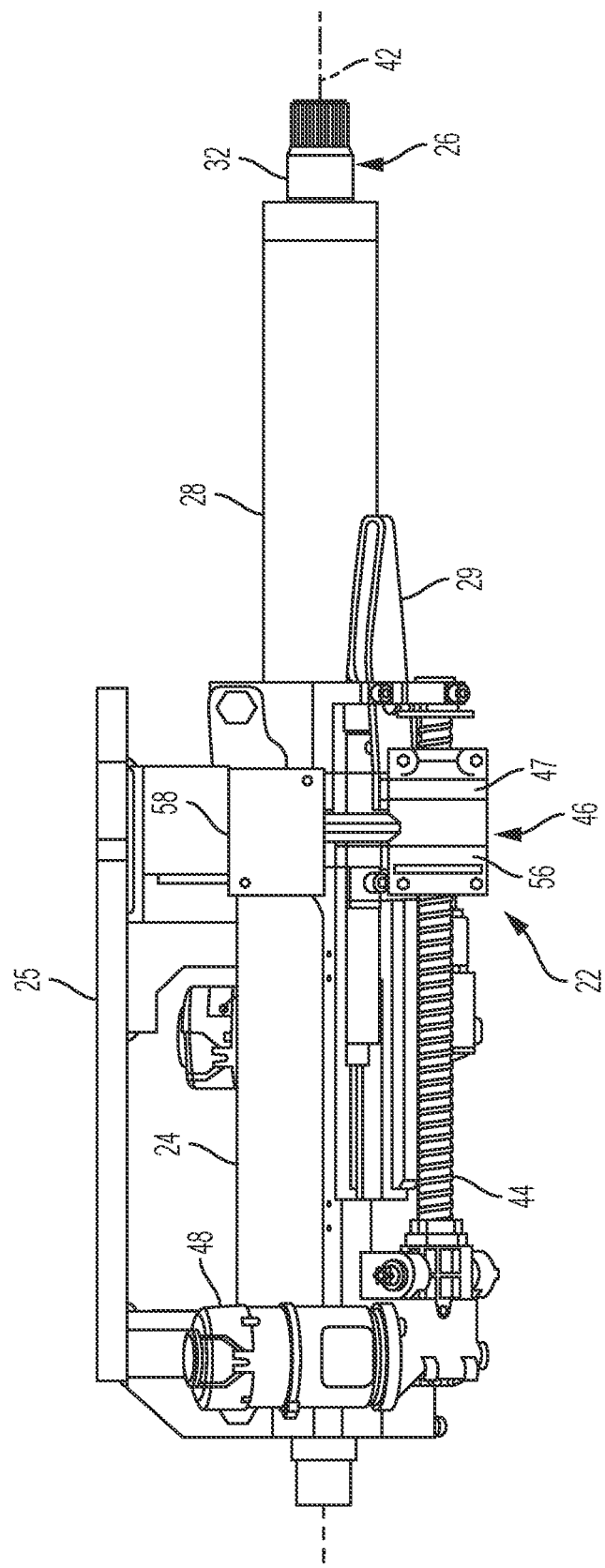
FIG. 2 is an elevational view of the steering column assembly.
Figure 3:
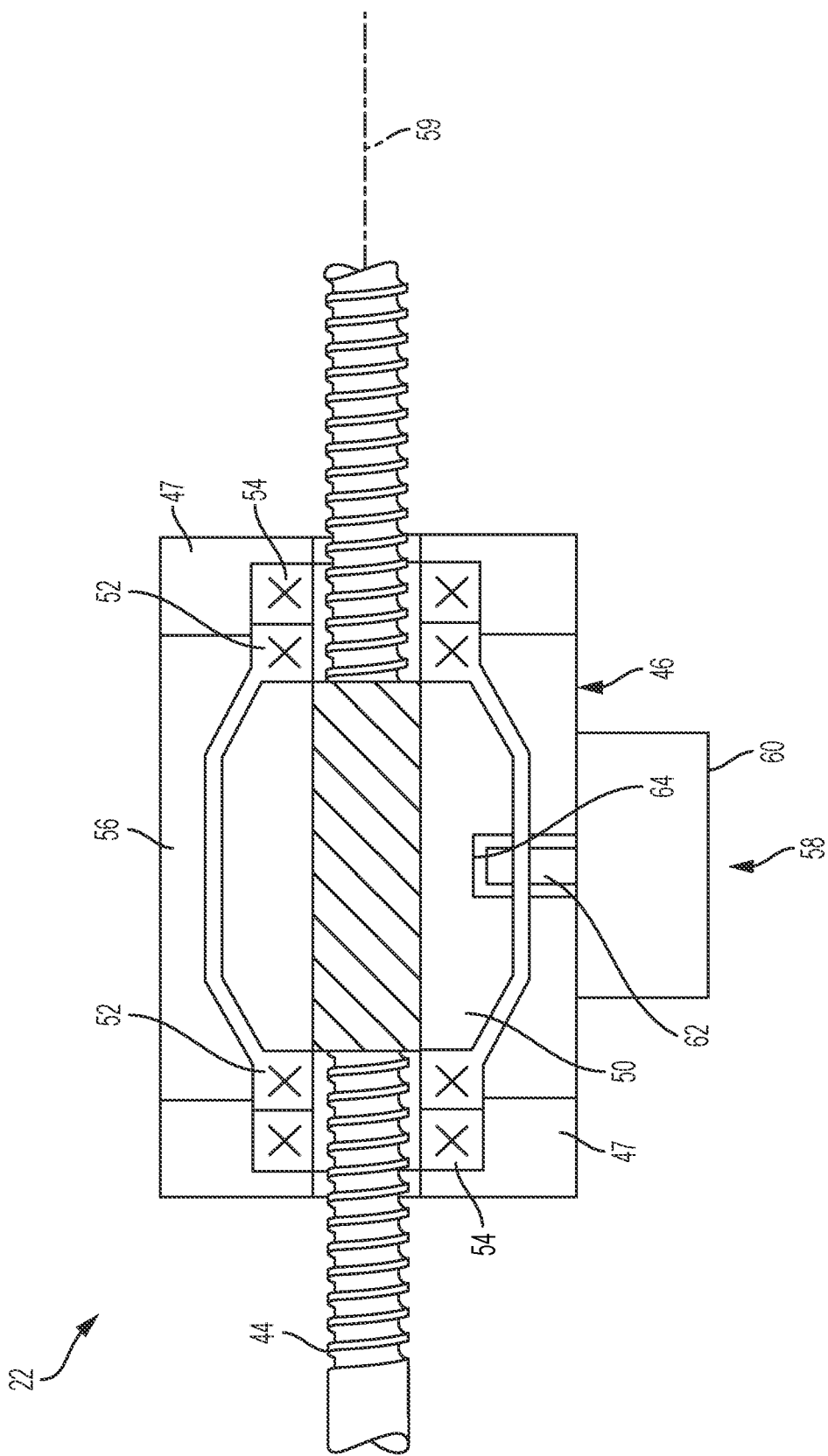
FIG. 3 is a sectional view of a portion of the steering column assembly.

FIGS. 2 and 3 illustrate an embodiment of features of the telescope actuator assembly 22 that facilitates adjustment of the steering column assembly 20. Multiple embodiments of a clutch device and nut are described in detail in U.S. patent application Ser. No. 15/628,836, which is incorporated by reference herein its entirety. FIGS. 2 and 3 illustrate an example of such features, but it is to be appreciated that the embodiments described herein are applicable to any powered steering column that allows manual adjustment thereof in some conditions, with such conditions defined herein.

FIGS. 2 and 3 illustrate a screw or threaded rod 44, a shuttle assembly 46, and the electric motor 48. The shuttle assembly 46 may include a shuttle 47 and a clutch device 58 that may be directly supported by and engaged to the shuttle 47, or a casing 56 of the shuttle 47.

The shuttle 47 of the shuttle assembly 46 may be mounted between the screw 44 and an E/A strap 29. More specifically, the shuttle assembly 46 is threadably mounted to the screw 44 for axial translation along the screw, and may be rigidly fixed to the E/A strap 29. In operation and when the electric motor 48 is rotating the screw 44, the shuttle assembly 46 axially translates along the rotating screw 44. During this axial translation, the rearward shaft portion 32 of the steering shaft 26 and the upper jacket 28 is carried by, and with, the shuttle assembly 46.

The shuttle assembly 46 may further include a nut or fixture 50, at least one bearing 52, at least one resilient member 54 (e.g., a coiled spring or a disc spring), and the casing 56. The screw 44 may be mounted for rotation to the lower jacket 24 and about a centerline 59, may not be mounted for axial translation along the lower jacket 24, and is rotatably driven by the electric motor 48 that may be rigidly mounted to the fixed lower jacket 24. The centerline 59 may be spaced from, and substantially parallel to, the axis 42.

The clutch device 58 may be mounted to the casing 56 and facilitates rotational decoupling of the nut 50 from the casing 56 (and/or shuttle 47). The clutch device 58 may include an electric servo 60 and a bolt 62. The servo 60 may be mounted to an exterior of the casing 56 and functions to move the bolt 62 into and out of at least one recess 64 defined by an external and circumferentially continuous surface of the nut 50. In one example, the recesses 64 may be axially extending grooves. The clutch device 58, including the electric servo 60 and the bolt 62 may be collectively referred to herein as a "latch" or "latch assembly", referenced with numeral 80.

In the present example, the casing 56 may be an integral part of the shuttle assembly 46 (i.e., one-piece), and thus axially translates with the shuttle assembly 46. The nut 50, the bearings 52, and the spring 54 may be mounted to the screw 44 inside the casing 56. The nut 50 is threaded to the screw 44 such that rotation of the screw 44 about centerline 59 causes the casing 56 and shuttle assembly 46 to axially translate along the screw 44. A first bearing 52 may be axially located between a first spring 54 and a forward end (i.e. annular face) of the nut 50. A second bearing 52 may be axially located between a second spring 54 and a rearward end of the nut 50.

In operation and when the steering column assembly 20 is in the powered state and the clutch device 58 is engaged, the forward and rearward bearings 52 minimize any friction produced between the springs 54 and the respective ends of the nut. The axial forces produced by the torque placed upon the screw 44 by the electric motor 48 when in the powered state are not sufficient to overcome the compressive force of the springs 54 (i.e., the springs do not compress axially).

When the steering column assembly 20 is in the decoupled state (i.e., not powered by the electric motor 48, the clutch device 58 is not engaged (i.e., the servo 60 is de-energized). A manual axial force produced by the driver to axially extend and or retract the steering column assembly 20 may cause the nut 50 to free-wheel (i.e., back spin) upon the, now stationary, screw 44 enabling the shuttle assembly 46 to axially translate.

The embodiments disclosed herein provide a steering column system that allows a user to steer the vehicle even after a failure of the steering column's telescoping mechanism. The embodiments disclosed herein provide an alternative way to unstow the steering column and do not require a functioning telescope actuator or its related wire harness, controller, power supply, or communication bus.

Figure 4:
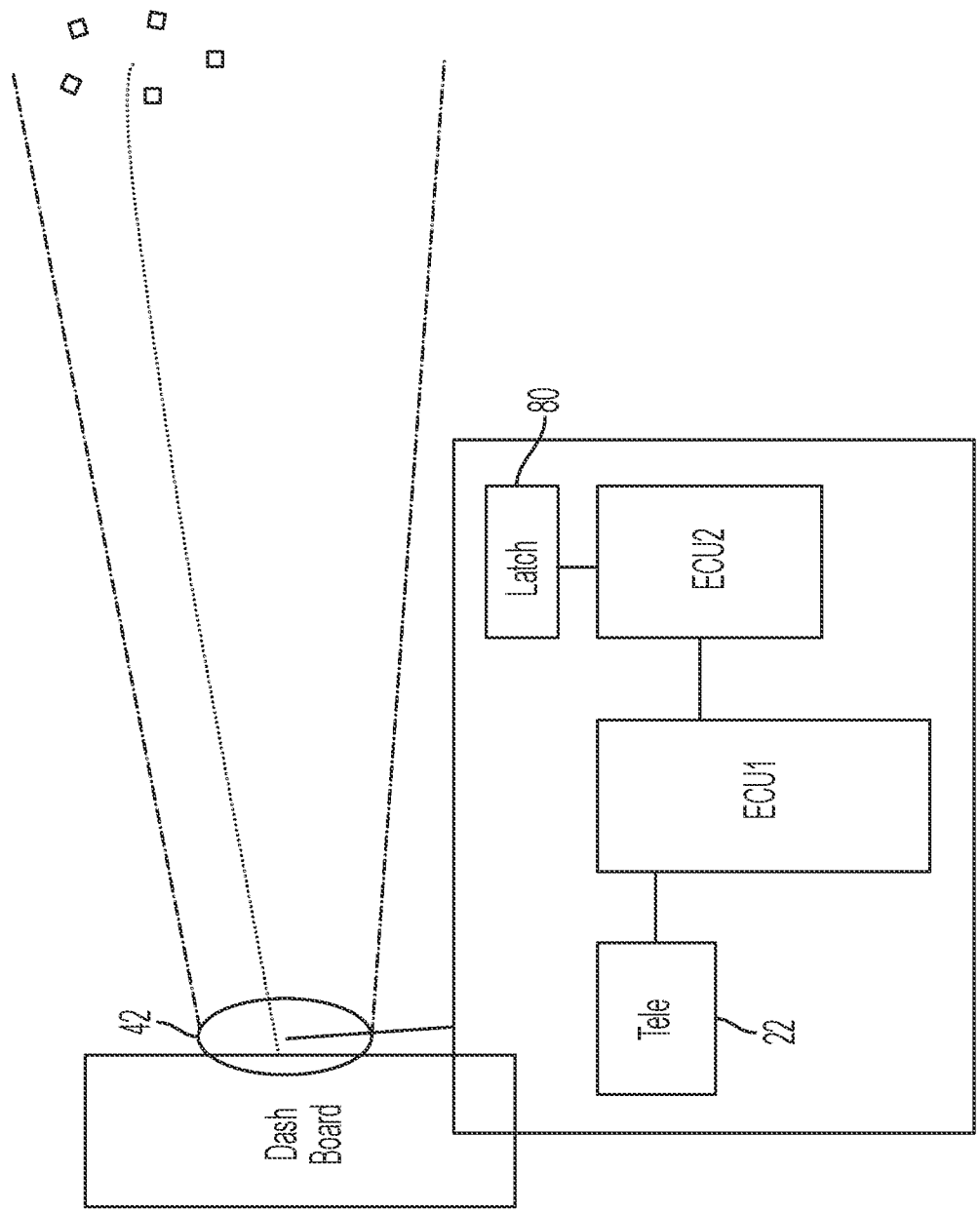
FIG. 4 is a schematic illustration of an auxiliary unstowing mechanism for the steering column assembly.

Referring to FIG. 4, the steering input device 42 is shown in a stowed or partially stowed position. The axial movement—or telescoping movement—is facilitated by the telescope actuator assembly 22. The telescope actuator assembly 22 is controlled, at least partially, by a first ECU (ECU1). The embodiments disclosed herein include a second ECU (ECU2) that is in wired or wireless communication with the first ECU. The second ECU powers and controls the latch assembly 80. The latch actuator 60 allows for release of the latch 80 that would otherwise prevent telescope movement of the steering column assembly 20. In other words, the latch actuator 60 controls whether the latch 80 is engaged or disengaged. In some embodiments, the latch actuator 60 is a motor, but other types of actuators are contemplated. In the engaged position, the steering column assembly 20 is locked in the stowed position—or partially stowed position. In the disengaged position, the steering column assembly 20 may be moved to the unstowed position. In some embodiments, the latch actuator 60 controls the bolt 62 that engages with the nut 50 of the clutch device 58.

The second ECU monitors the condition of the first ECU with one or more signals and is capable of detecting failure of the telescoping mechanism 22 or the first ECU while the steering column assembly 20 is stowed, partially stowed. During the failure, the second ECU allows latch functionality via the latch actuator 60, so the user can unstow and steer the vehicle. Inability to unstow may arise due to a failure of one or more parts of the electromechanical system (e.g., telescope actuator assembly 22) that is required to perform the unstow operation. Examples of such parts include the telescope electric motor 48, the ECU that controls the telescope motor (ECU1), the battery that powers ECU1, a wire harness, and/or a gear.

Figure 5:
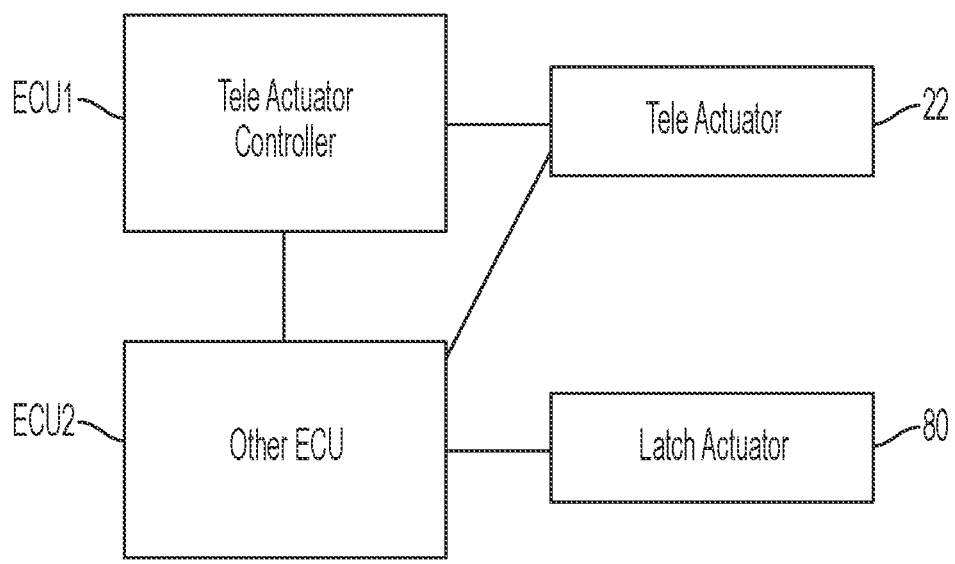
FIG. 5 is a schematic illustration of the auxiliary unstowing mechanism according to another aspect of the disclosure.

FIG. 5 illustrates an embodiment having the second ECU in direct communication (wired or wireless) with the telescope actuator assembly 22 in addition to the first ECU. This provides the capability of the second ECU to directly monitor the telescope actuator assembly 22 and the first ECU for a failure condition of either the telescope actuator assembly 22 or the first ECU.

As described above, the stow feature may be used while the vehicle is parked or while a high-level automated driving feature is engaged (e.g., autonomous or semi-autonomous driving modes).

Figure 6:
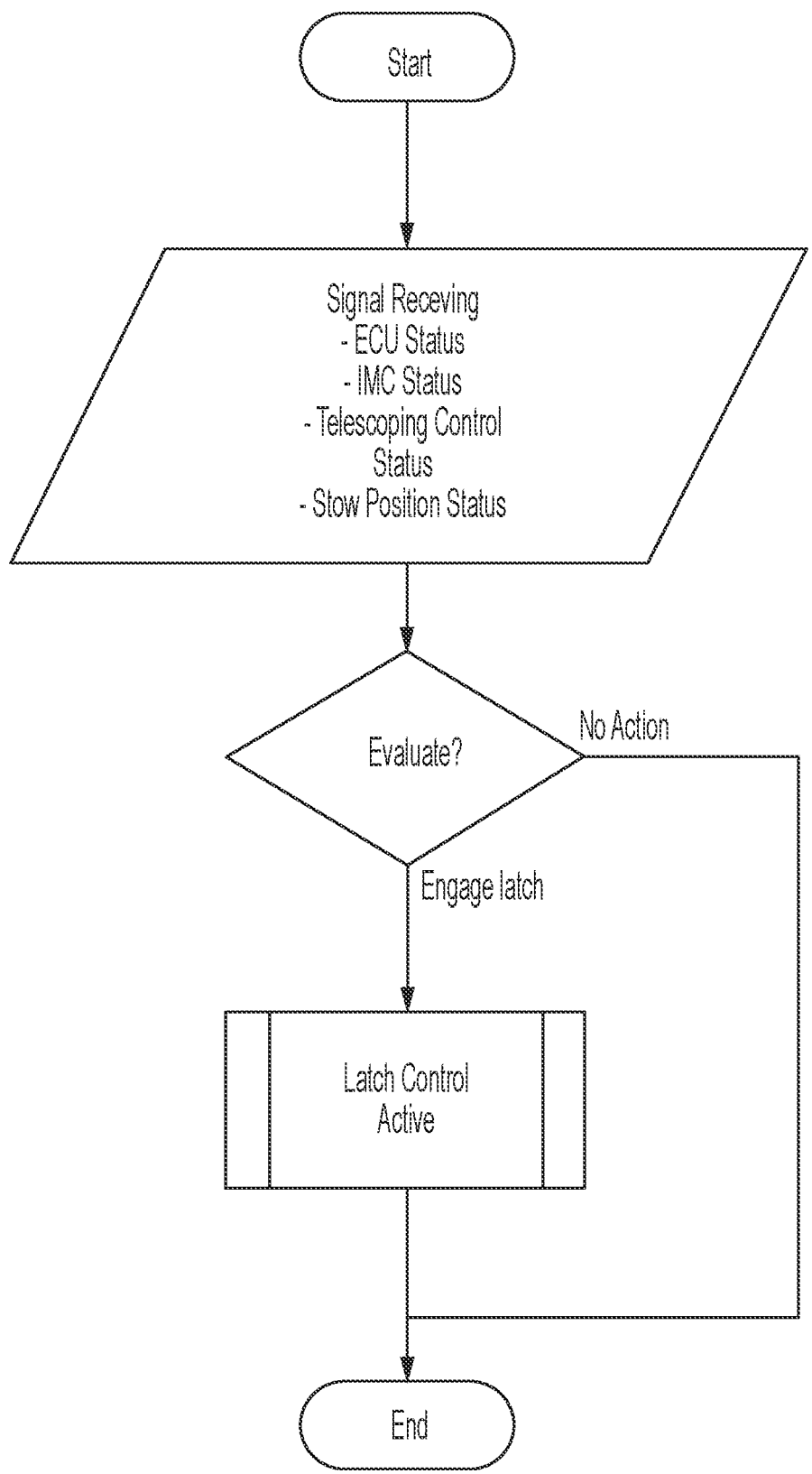
FIG. 6 is a flow diagram for operation of the auxiliary unstowing mechanism for the steering column assembly.

Referring now to FIG. 6, a method of providing auxiliary unstow capability for the steering column is illustrated by way of the flow diagram. In particular, the ECU (e.g., ECU2) that controls the latch actuator 60 receives a signal from the telescoping control ECU (e.g., ECU1) to evaluate whether latch control should be active or not.

While the invention has been described in detail in connection with only a limited number of exemplary embodiments, it should be appreciated that the invention is not limited to such embodiments. Rather, the invention can be modified to incorporate any number of variations, alterations, substitutions, or equivalent arrangements not heretofore described, but that are commensurate with the spirit and scope of the invention. Additionally, while various non-limiting exemplary embodiments of the invention have been described, it should be appreciated that aspects of the invention may include only some of these embodiments. Accordingly, the invention is not to be seen as limited by the foregoing description.

What is claimed is:

1. An auxiliary unstow mechanism for a vehicle steering column, the auxiliary unstow mechanism comprising:
   a telescope actuator assembly;
   a first electronic control unit (ECU) in communication with the telescope actuator assembly to control the telescope actuator assembly;
   a latch actuator operatively controlling a latch assembly that controls a locked condition and an unlocked condition of vehicle steering column axial position; and
   a second ECU in communication with the first ECU and the latch actuator, the second ECU controlling the latch actuator, wherein the latch assembly is in the locked condition in a stowed or partially stowed position of the vehicle steering column to prevent manual adjustment of the vehicle steering column, and wherein the latch assembly is in the unlocked condition to allow manual adjustment of the vehicle steering column.

2. The auxiliary unstow mechanism of claim 1, wherein the latch assembly is switched to the unlocked condition by the latch actuator upon detection of a failure condition of the first ECU by the second ECU.

3. The auxiliary unstow mechanism of claim 1, wherein the second ECU is in direct communication with the telescope actuator assembly.

4. The auxiliary unstow mechanism of claim 3, wherein the latch assembly is switched to the unlocked condition by the latch actuator upon detection of a failure condition of the first ECU by the second ECU.

5. The auxiliary unstow mechanism of claim 3, wherein the latch assembly is switched to the unlocked condition by the latch actuator upon detection of a failure condition of the telescope actuator assembly by the second ECU.

6. The auxiliary unstow mechanism of claim 1, wherein the telescope actuator assembly comprises:
   a nut operably threaded to a screw for translating motion between a screw and the nut;
   a casing operably engaged to the nut;
   a bearing operably disposed between the casing and the nut.

7. The auxiliary unstow mechanism of claim 6, wherein the bearing is a clutch bearing.

8. The auxiliary unstow mechanism of claim 6, wherein the telescope actuator assembly further comprises a resilient member disposed axially between the bearing and the casing.

9. The auxiliary unstow mechanism of claim 6, wherein the casing is a shuttle, and the telescope actuator assembly further comprises a clutch device engaged to the shuttle and configured to lock the shuttle to the nut.

10. The auxiliary unstow mechanism of claim 9, wherein the clutch device includes a bolt disposed in a groove in the nut to facilitate locking the shuttle to the nut.

11. A method of unstowing a vehicle steering column comprising:
   operating a telescope actuator assembly with a first electronic control unit (ECU);
   operating a latch actuator with a second ECU; and
   monitoring the first ECU for a failure condition of the first ECU and/or the telescope mechanism with the second ECU.

12. The method of claim 11, further comprising unlocking a latch assembly with the latch actuator.

13. The method of claim 11, further comprising monitoring for a failure condition of the telescope mechanism with the second ECU.

14. The method of claim 13, further comprising unlocking a latch assembly with the latch actuator.

* * * * *